United States Patent [19]

Malinowski et al.

[11] 4,319,227
[45] Mar. 9, 1982

[54] THREE STATE SIGNALING SYSTEM

[75] Inventors: Christopher W. Malinowski, Untereisesheim; Heinz Rinderle, Heilbronn; Martin Siegle, Weinstadt-Beutelsbach, all of Fed. Rep. of Germany

[73] Assignee: Licentia Patent-Verwaltungs-G.m.b.H., Frankfurt am Main, Fed. Rep. of Germany

[21] Appl. No.: 85,335

[22] Filed: Oct. 16, 1979

[30] Foreign Application Priority Data

Jun. 2, 1979 [DE] Fed. Rep. of Germany ....... 2922595

[51] Int. Cl.³ .......................................... H03K 13/24
[52] U.S. Cl. .......................................... 340/347 DD
[58] Field of Search ................ 340/347 DD; 358/262; 307/209

[56] References Cited

U.S. PATENT DOCUMENTS 2,926,346 2/1960 Smith .......................... 340/347 DD
3,969,633 7/1976 Paluck ................................ 307/209
4,100,429 7/1978 Adachi ................................ 307/209

FOREIGN PATENT DOCUMENTS 2657948 7/1977 Fed. Rep. of Germany.
2752204 6/1978 Fed. Rep. of Germany.

Primary Examiner—Charles D. Miller
Attorney, Agent, or Firm—Spencer & Kaye

[57] ABSTRACT

Digital information transmission system components including at least one unit arranged to transmit signal elements in parallel, at least one unit arranged to receive signal elements in parallel, and a corresponding plurality of signal transmission paths connected between such units to each convey a respective one of the signal elements, in which a unit serving to transmit such signal elements is constructed for selectively creating, in each path, a signal element in the form of a signal state representing either one of two binary values or a signal state different from that representing either such binary value; and a unit serving to receive such signals is constructed for producing a response which distinguishes between the appearance, in each path, of either binary value state or the different state.

9 Claims, 19 Drawing Figures $V_0 = I_0 R1 \quad -V_0 = I'_0 R2$

| POSITION OF MOVABLE CONTACT OF SWITCH | | | | ILLUMINATED LED |
|---|---|---|---|---|
| S1 | S2 | S3 | S4 | |
| 2 | 1 | 3 | 3 | E1 |
| 2 | 3 | 1 | 3 | E2 |
| 2 | 3 | 3 | 1 | E3 |
| 1 | 2 | 3 | 3 | E4 |
| 3 | 2 | 1 | 3 | E5 |
| 3 | 2 | 3 | 1 | E6 |
| 1 | 3 | 2 | 3 | E7 |
| 3 | 1 | 2 | 3 | E8 |
| 3 | 3 | 2 | 1 | E9 |
| 1 | 3 | 3 | 2 | E10 |
| 3 | 1 | 3 | 2 | E11 |
| 3 | 3 | 1 | 2 | E12 |

THREE STATE SIGNALING SYSTEM

BACKGROUND OF THE INVENTION

The present invention relates to digital information transmission systems of the type in which groups of binary signals, or bits, are transmitted in parallel over a corresponding plurality of connecting lines between circuit units, each circuit unit normally being formed on a respective chip.

Digital information transmission circuits are used to a large extent in the fields of electronic data processing including computers and the like, automation, communications, etc. Digital systems in the above fields include, for example, digital equipment, such as those serving for data input, data storage, control mechanisms, data output and readout devices, etc. where signals exchange takes place according to a certain program.

Keyboards with coding matrices or analog/digital converters which converts analog input values into digital form are known to be used for data read-in.

Traffic between such units takes place by means of digital signals, it being most common to use a binary system to represent such information. The various units then process switching variables which can have only two values: Logic 1 and Logic 0. The two values are typically represented by different signal levels in that, for example, the Logic 1 is represented by a positive potential and the Logic 0 by a negative or zero potential. According to another possibility, Logic 1 can be represented by a signal current flowing in the positive direction and Logic 0 by a signal current flowing in the negative direction.

The number of transmission paths, or lines, which must be provided depends on the length of the binary sequence, or word, to be transmitted in parallel and N transmission paths can handle $2^N$ different signal combinations. If, for example, a binary transmission system has four or eight transmission paths, 16 or 256 different binary signal combinations, respectively, can be transmitted therethrough.

If a large quantity of binary information is to be processed in parallel a correspondingly large number of transmission paths are required so that for the transmission of such information via electrical lines, the line networks attain considerable dimensions. With integrated circuits, known as IC's, the number of terminals is limited in most cases for reasons of standardization, reliability and economy, so that likewise the number of binary signal combinations transmitted through the circuit in parallel is limited correspondingly.

The trend is now to ever larger IC's including more and more electronic elements and functions, including multilayer circuit structures and the like, which require either a correspondingly large number of transmission connections, thus increasing the fabrication costs involved and also the dimensions of the IC's, or means on each IC for converting a large number of parallel bits into several groups which can be transmitted serially, which also increases fabrication costs and IC dimensions and, additionally, significantly reduces processing speed.

A similar situation exists in the case of the digital modules employed in the field of retail electronics. For example, the industry supplying that market considers the development of a planar screen viewer having light emitting diodes, known as LED's, to be impossible simply because of the large number of control lines required to control the LED's, given that an LED viewing screen with a resolution of only 1%, i.e. composed of a matrix having $100 \times 100 = 10,000$ LED's, requires 200 control lines for the matrix.

Even when glass fiber optics are used for the transmission of information in computers employing high bits densities, difficulties have arisen due to the required large number of transmission lines, if, for example, more than 32 to 64 LED's acting as transmitters cooperate with PIN diodes or phototransistors acting as receivers.

SUMMARY OF THE INVENTION

It is therefore an object of the present invention to reduce the number of transmission paths required to transmit a given quantity of information in parallel, or, conversely, to increase the quantity of information which can be transmitted in parallel over a given number of transmission paths.

It directly follows that a specific object of the invention is to reduce the number of connecting pins which must be provided on a IC having a given circuit configuration without reducing the amount of information which can be transmitted to or from that IC in parallel and while requiring a relatively small increase in the amount of circuitry which must be provided on that IC.

A further specific object of the invention is to provide circuit arrangements for controlling the parallel transmission of such information in systems provided with such a reduced number of connecting lines and pins.

These and other objects are achieved, according to the present invention, in a digital information transmission system including a plurality of circuit units between which digital, for example binary, signals are conducted in parallel, and a corresponding plurality of signal paths connected between two such units to each convey a respective one of the binary bit signals, by providing means at a unit which is to transmit such signals for creating, in each path, either a signal state representing either binary value, or a signal state different from that representing either binary value, and means at each unit which is to receive such signals for producing a response which distinguishes between the appearance of either binary value state and the state different therefrom in each signal path.

The systems, and components, according to the present invention, are based on a radically new technique for compressing the number of control lines necessary for transmitting binary information between individual circuit units. A major aspect of the invention is that it enables the total number of connecting lines between such units to be substantially reduced, particularly in those cases where each group of binary signals originates from, or is directed to, a selected region of such a circuit unit. Yet, it can be applied to a wide variety of existing binary circuit units and devices.

While systems and components according to the invention utilize a third signal state which is different from those representing the two binary value states, they do not employ a multilevel, or more specifically three-level, logic to transmit the information, so that all known binary data processing circuitry can be employed in systems according to the invention, or, stated in other terms, this invention is fully compatible with such systems. Briefly, and possibly incompletely, stated, the present invention utilizes the preexisting capability of connecting lines to be placed in a third signal state, possibilities for which will be described below, different from the two signal states that represent the two possible binary values, to transmit, via one or several of a given plurality of lines, information which can identify the region of origin or of destination, or the significance in some other respect, of the binary value information being simultaneously transmitted via the other lines of the group. Thus, the total information being transmitted will be a function of the binary value signals being transmitted over a certain number of lines of the group, together with the positional information provided by selecting the position, within the group, of the line or lines on which the third signal state is imposed.

Systems according to the invention operate, in effect, according to a new principle of representing information, by which an optimum interrelationship can be established between conventional binary representations of numerical and alpha-numeric information and a novel positional representation. Mathematically, these forms of representation differ diametrically from one another, the conventional binary representations being based on the familiar positional, weighted system, while the novel representation is based on a relatively positional system. Optimization is achieved by combining the two types of representation in a manner to achieve a maximum density of information transmitted in parallel for a given number of transmission paths.

Systems according to the invention originate from recognition that any given Boolean expression, $b_1, b_2, \ldots b_p$, where each b is a logic variable capable of having a value of either logic 1 or logic 0, can be combined with an expression represented by a third value inserted at a selected location, or locations within the Boolean expression. As will be seen, such an approach retains the binary nature of all of the signal processing operations while substantially increasing the information density in the parallel signal transmissions. Each occurrence of the third state in a signal transmission path will be denoted herein as a "combit". Correspondingly, a word containing both binary value bits and combits, all of which are conducted in parallel between certain units, will be denoted herein as a "comword".

To provide one example of a combined expression according to the invention, a conventional two-bit binary expression which can be transmitted in parallel via two transmission paths, or lines, can have any one of four distinct values: 00; 01; 10; and 11. If such an expression were supplemented by a single combit (c) and three transmission paths were provided, the two-bit binary expression could be transmitted in parallel together with the single combit, with the latter being transmitted over any one of the three transmission paths. Thus, for each value of the two-bit binary expression, any of three different signal combinations could be transmitted in parallel, each combination differing from the others by the position of the combit, that is the particular line on which the combit appears. The combit itself has no weighted value, but the information which it provides is determined by its relative position within the comword. Thus, while retaining the information contained in the two-bit binary expression, three different comwords, each having a different information content, could be created for each two-bit binary value. Since three different comwords can be created with respect to each two-bit binary value, a total of twelve different comword values, each having a respectively different information content, can each be transmitted in parallel over three transmission paths. The positions of the three bits of each comword in the three transmission paths, for each comword value, are set forth in Table 1, below.

| Transmission Path | Comword Values |   |   |   |   |   |   |   |   |   |   |   |
|---|---|---|---|---|---|---|---|---|---|---|---|---|
| 1 | 0 | 0 | c | 0 | 0 | c | 1 | 1 | c | 1 | 1 | c |
| 2 | 0 | c | 0 | 1 | c | 0 | 0 | c | 1 | 1 | c | 1 |
| 3 | c | 0 | 0 | c | 1 | 1 | c | 0 | 0 | c | 1 | 1 |

It will be seen that the information represented by the binary value is retained on the basis of the order of the binary value bits across the transmission path, while additional information is provided by the identity of the transmission path containing the combit. In order to utilize all of the information contained in such a comword, it is only necessary to provide circuitry which distinguishes between the binary values and the combit value, identifies which transmission path contains the combit value and maintains the sequence of binary value bits across the transmission path. Suitable circuitry of this type will be described and illustrated herein.

A particular noteworthy feature of the above-described combined expression is that it enables a comword having any one of twelve different values, each relating to a respectively different information content, to be transmitted via only three transmission paths, whereas the same number of transmission paths makes possible the transmission of only eight different binary value combinations. As will become more readily apparent, the increase in information content offered by the present invention becomes even greater as the total number of transmission paths, or parallel conducting lines, increases.

In order to implement the present invention, it is necessary to have available an electrical signal value which is detectably different from the signal values representing the two binary states. At the same time, it is desirable to avoid the disadvantages presented by known multilevel logic techniques. Both of these goals are achieved, according to the present invention, by making use of a third signal state which is already commonly used, and available, in binary data processing systems. This is known in the art as the "three-state", which can be reliably used in order to provide three different signal states. Other electrical states could be utilized to represent the different, or third, state.

To cite one example, there are many binary systems in which the Logic 1 state is represented by positive voltage and the Logic 0 state is represented by ground potential, or possibly even a negative voltage. In addition, it is possible, in these systems, to create an open circuit condition in any transmission path, or connecting line. In some existing systems, this open circuit condition is employed, for example by connecting a three-state buffer in each transmission path, for the purpose of isolating a particular circuit unit from a transmission bus.

In the practice of the present invention, this open circuit state can be differentiated, using well-known electrical means, with a degree of reliability comparable to that existing for the detection of the two binary value states.

Thus, in systems according to the present invention, the three signal states applicable to each connecting line can be constituted by: (1) a positive voltage or forward current flow condition, referred to herein as the "H" state; (2) a ground potential, negative voltage or negative current flow state, referred to herein as the "L" state; and (3) the open line, or high impedance, state, referred to herein as the "three-state". Any one of these states can be employed to represent the combit, while the other two states would then represent the two binary value states. As will become more readily apparent, the choice of the identity of each signal state will depend to a considerable extent on the nature of the circuit unit which is to be controlled by, or to receive, comwords in accordance with the present invention.

A significant advantage offered by the present invention resides, in particular, in that the range of application for digital systems, circuit arrangements and the like can be expanded very easily and the function units already employed can be retained without modification, permitting large quantities of information to be transmitted even between components having a relatively small number of terminals. In systems having a comparatively small number of transmission lines, the invention permits an information transmission capacity increase, compared to prior art systems, of between 50 to 100%, while for systems having larger numbers of transmission lines the resulting increases are more than 100%. A 16 bit computing system according to the invention has a capacity, with respect to information transfer, comparable to that of a conventional 32 bit binary computer.

The present invention is not limited to any particular digital code and is fully compatible with conventional digital information transmission systems.

DESCRIPTION OF THE PREFERRED EMBODIMENTS

As has been stated above, the system according to the present invention permits a substantial increase in the amount of information which can be transmitted in parallel on a given number of lines, or, conversely, a substantial reduction in the number of the lines required to transmit a given amount of information in parallel. It has been found that the magnitude of the improvement achieved depends on both the total number of parallel transmission paths available and the number of combits which will be present in a comword. If a comword contains a total of N elements, requiring N transmission paths, and that comword contains M combits, the total number K of different comwords which can be formed will be equal to the product of the number of combinations of M elements, or combits, in the N position of each comword, and the total number of binary words which can be created in N-M bit positions. This can be expressed as follows:

$$K = 2^{N-M} \cdot \frac{N!}{M!(N-M)!}$$

From the above relationship, a quantitative evaluation of the improvement offered by the present invention can be established. For this purpose, a function A(M, N), termed an "advantage ratio" can be defined as follows:

$$A(M,N) = 2^{-M} \cdot \frac{N!}{M!(N-M)!}$$

Figure 1:
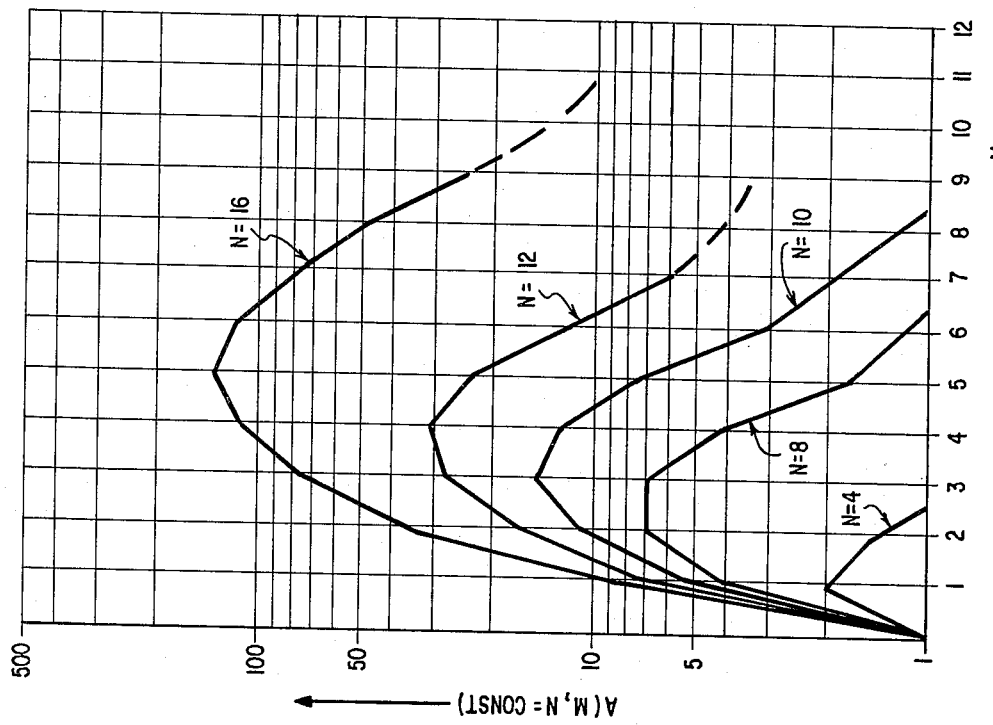
FIGS. 1 and 2 are diagrams containing curves illustrating the improvements offered by the invention.

The value of A represents the ratio of the maximum number of different comwords, each having a bit length of N, to the maximum number of different words of the same length, N in a conventional binary system. As one example, the advantage ratio A defines the increase in the number of memory locations which could be addressed by transmission of a comword via a transmission bus having N transmission paths compared to the number of memory locations which could be addressed, via the same transmission bus, by conventional binary words. FIG. 1 illustrates the relationship between the maximum advantage ratio offered by the present invention and the number of parallel transmission paths. This curve is derived by selecting, for each value of N, that value of M which yields the highest advantage ratio. It will be seen that a transmission bus composed of eight transmission paths, or connecting lines, for example, permits attainment of a maximum advantage ratio of 7, i.e. use of 8-element comwords would provide seven times the memory location addressing capability as conventional 8-bit binary words. In the case of a transmission bus composed of sixteen paths, the maximum advantage ratio exceeds 130.

It can be derived from the above expressions that the number of unidirectionally conducting passive receiving devices, e.g. diodes, which can be individually addressed by an N element comword is equal to N(N-1), whereas the number of such devices which can be addressed via N transmission paths according to the prior art is no more than $(N/2)^2$.

As has been noted above, the advantage ratio provided by a comword having a particular length depends on the number of combits in the word and it is possible, within the context of the present invention, to provide comwords having one combit combined with (N-1) standard binary bits, two combits in combination with (N-2) standard binary bits, etc. However, there is a definite maximum to the advantage ratio for each value of N, and this defines the optimum value of M for each value of N, that is a value which yields the highest advantage ratio.

Figure 2:
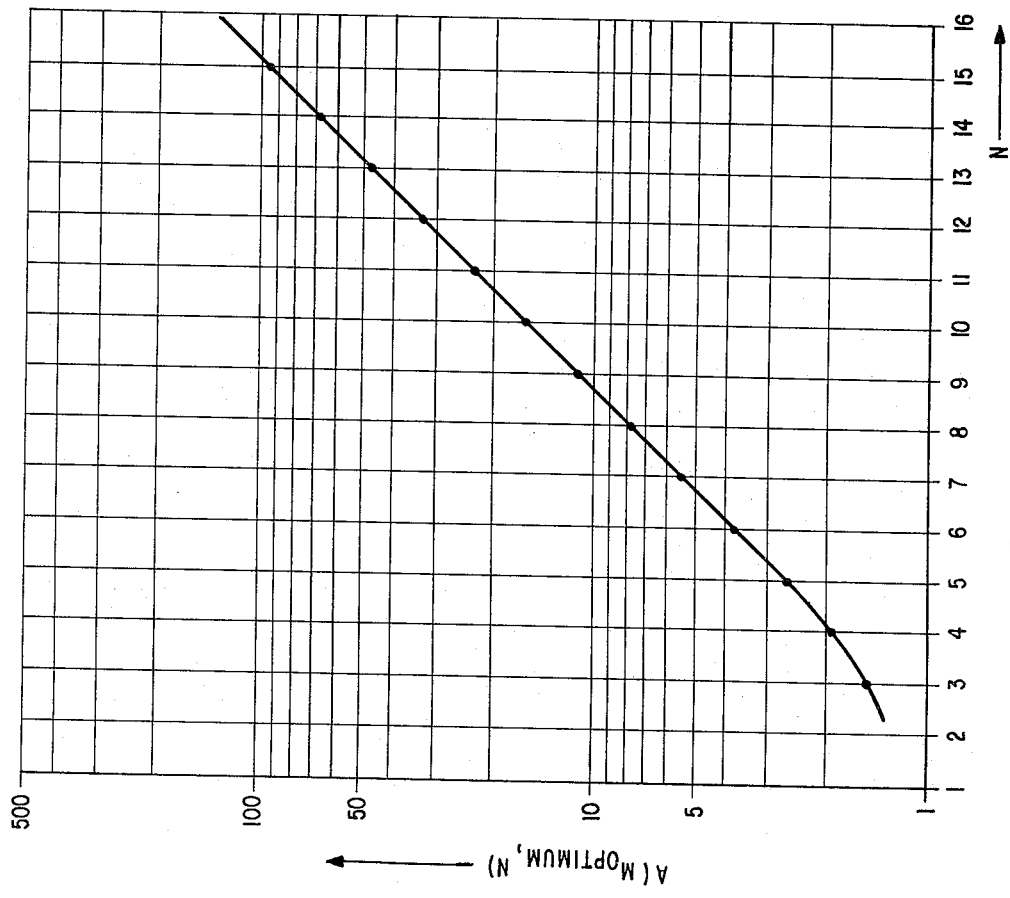

It has been found that for every value of $N>2$, a one-combit system will always create an advantage ratio greater than one, while in any system for which $N>5$, the provision of two or more combits will yield a significantly higher advantage ratio. FIG. 2 illustrates variations in the value of the advantage ratio as a function of M for different discrete values of N.

Even though systems employing one combit (M=1) will not produce the maximum advantage ratio when the total number of transmission paths is greater than 5, the use of comwords having this configuration will be of significant importance in a number of fields of practical application. In particular, certain types of circuit units, which constitute "passive receivers", have a natural ability to detect only a single combit in a transmitted word and these circuit units can thus automatically, without being provided with any additional hardware whatsoever, be arranged to differentiate between information values.

In general, since the present invention permits a greater amount of information to be transmitted in a parallel manner over a selected number of transmission paths, utilization of the invention entails compression of conventional binary data at one end of a transmission bus, that is at a circuit unit which functions as a transmitter, and subsequent expansion of the transmitted information at the other end of the bus, that is in a circuit unit which functions as a receiver. Thus, implementation of the invention requires the provision of circuitry capable of effecting such compression and expansion operations.

For the sake of the following descriptions, it will be assumed that information is to be transmitted in the form of electrical signals, although signals in other forms, for example mechanical, pneumatic, hydraulic, magnetic or optical, could be employed.

A number of examples of elementary, passive, electrical signal receivers will now be described, with reference to FIGS. 3a–3d.

As has been noted above, the present invention utilizes the fact that an electrical transmission line which connects an information transmitter and an information receiver can be in, or support, three different states:

(a) energy flows through the transmission line in one direction, or potential of one polarity is present on the line;

(b) energy flows through the transmission line in the opposite direction, or potential of the opposite polarity, or ground potential is present on the line;

(c) no energy flows through the transmission line, or the line is open-circuited, i.e. the information source is disconnected from the transmission line.

State (a) may correspond to the active "H" state, state (b) to the active "L" state and state (c) to the so-called three-state, or open line condition, of a transmission line in a binary transmission system. However, as will be seen, other arrangements are possible, and often preferable.

FIGS. 3 show various embodiments of a transmitter which can transmit any one of the three states (a), (b), and (c) via lines L1 and L2 to a receiver which has passive receiver elements that by nature are capable of detecting and differentiating between these three states.

Figure 3A:
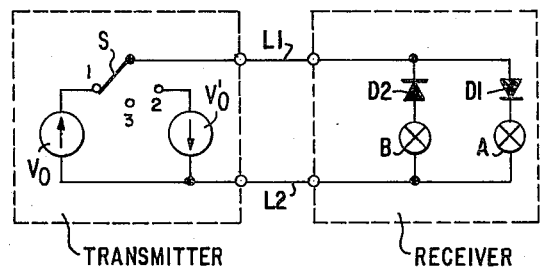
FIGS. 3a-3d are simplified circuit diagrams of possible information transmission schemes conforming to the invention between a transmitter and passive receiver interconnected by two transmission paths.
Figure 3B:
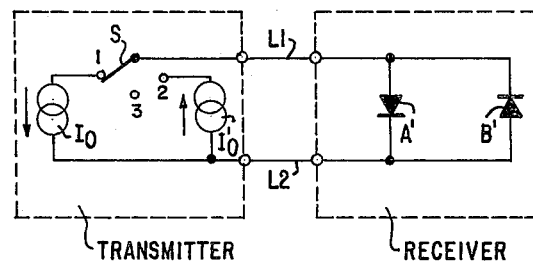
Figure 3C:
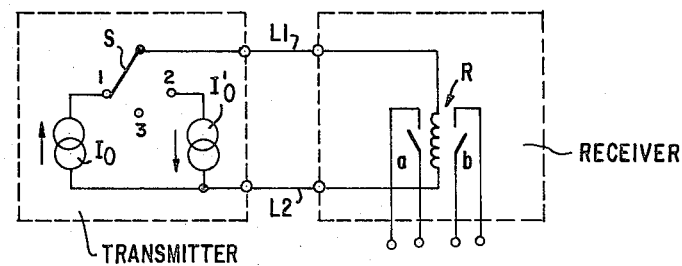
Figure 3D:
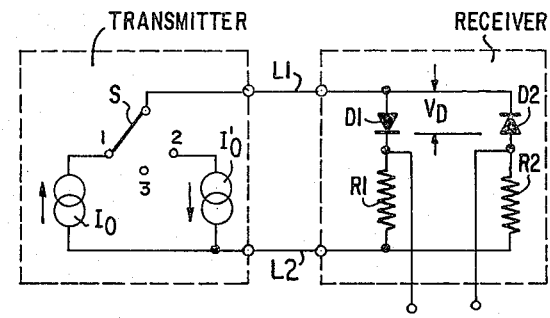

The transmitter T shown in FIG. 3a, for example, includes two voltage sources Vo and V'o, while the transmitter of FIGS. 3b, 3c and 3d includes two current sources Io and I'o, each transmitter being further provided with a switch having three switching positions defined by contacts 1, 2 and 3, respectively. Contact 1, for example, is connected to the positive pole of source Uo or Io, contact 2 is connected to the negative pole of the other source U'o or I'o, and contact 3 remains open circuited. The movable contact of the switch is permanently connected at point s to one transmitter output and the other terminals of the sources are connected together and brought to the other output of the transmitter. The two outputs are connected, via lines L1 and L2, to the inputs of the receiver.

In FIG. 3a, the receiver includes two data circuits each composed of two passive receiver elements including a diode D1 or D2 and a respective lamp A or B. Diodes D1 and D2 are connected in parallel opposition. In switch position 1, current flows through line L1 in the direction shown by the upper arrow, from the transmitter to the receiver, so that diode D1 becomes conductive and the series connected lamp A lights up while lamp B remains dark. In switch position 2, a current flows in the opposite direction, so that diode D2 becomes conductive and the series connected lamp B is lit. In switch position 3 line L1 is disconnected from the transmitter and thus no current flows, so that both data circuits become nonconductive and both lamps A and B remain dark.

The response of the receiver to the switching state of the switch, i.e. the position of the movable contact, is represented by the following table:

| Position of switch contact | FIGS. 3a and 3b: State of Lamp | |
|---|---|---|
| | A(A') | B(B') |
| 1 | On | Off |
| 2 | Off | On |
| 3 | Off | Off |

In FIG. 3b the receiver elements are two light emitting diodes A', B' connected in parallel opposition so that they also distinguish between the three states of line L1, corresponding to the respective position of the switch and the resulting current behavior, i.e. positive or negative direction, or no current. The response of diodes A' and B' is depicted in the table above.

In FIG. 3c there is provided a current direction, or polarity, sensitive relay R. Each of its contacts a and b closes in response to a respectively different current direction, while both open in the absence of current. The response to contacts a and b is shown in the following table:

| Position of switch contact | State of relay contact | |
|---|---|---|
| | a | b |
| 1 | closed | open |
| 2 | open | closed |
| 3 | open | open |

FIG. 3d shows a receiver composed of two diodes D1 and D2 connected in parallel opposition relative to one another and each connected in series with a resistor R1 or R2. The voltage drops occurring in response to the different positions of the switch are shown in the following table:

| Position switch contact | FIG. 3d: Voltage across | |
|---|---|---|
| | R1 | R2 |
| 1 | R1 . Io | 0 |
| 2 | 0 | Io . R2 |
| 3 | ~0 | ~0 |

If the same receivers were used in a conventional binary information transmission system, only two different states would be detected at the receiving end.

Figures 4A, 4B:
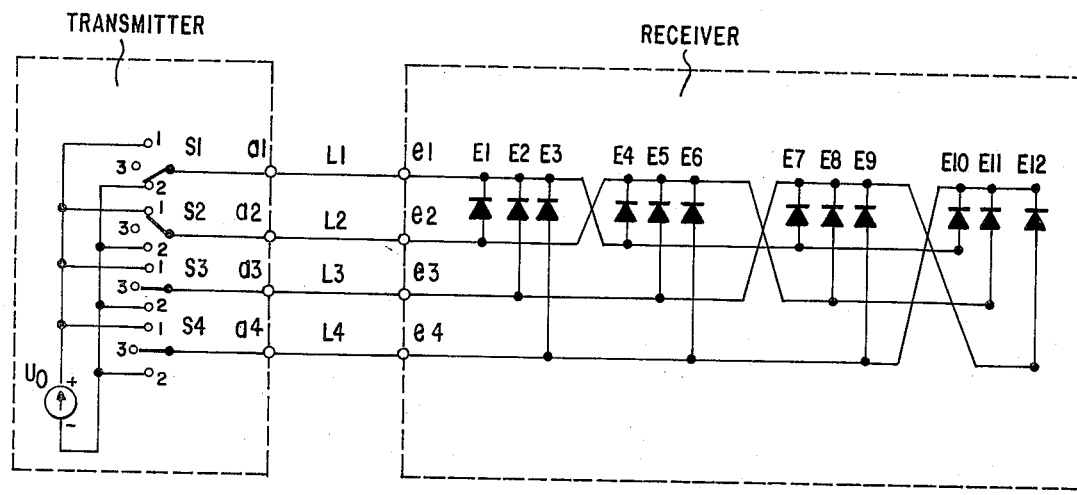
FIG. 4A is a simplified diagram of a transmitting-receiving system according to the invention having four transmission paths.
FIG. 4B is a table for explaining the operation of FIG. 4A.

FIG. 4a shows a transmitter-receiver system including four transmission lines L1, L2, L3 and L4, a transmitter having a current source $U_o$ whose negative pole is connected to contacts 1 and whose positive pole is connected to the contacts 2 of four stepping switches S1, S2, S3 and S4. Each switch has a contact 3 which is again open-circuited. The movable contacts of the switches are brought to the outputs a1, a2, a3 and a4, respectively, of the transmitter, those outputs being connected to the inputs e1, e2, e3 and e4, respectively, of a receiver via respective lines L1, L2, L3 and L4. Twelve passive receiver elements in the form of light emitting diodes E1 through E12 are connected together in the manner shown and are connected via four control lines to the inputs e1 through e4 of the receiver. The twelve LED's form a display matrix and each LED can be addressed directly.

The LED's E1 through E3, E4 through E6, E7 through E9 and E10 through E12 are combined into groups, the cathodes of the LED's of each group being connected together and to one of the transmission lines, while each anode of the LED's of each group is connected to a respective one of the transmission lines which is not connected to the parallel connected cathodes of the respective group. Thus, at their cathode sides, diodes E1 to E3 are connected to L1; E4 through E6 to L2; E7 through E9 to L3; and E10 through E12 to L4. The connections at the anode sides are as follows: E1, E8 and E11 to L2; E2, E5 and E12 to L3; E3, E6 and E9 to L4; and E4, E7 and E10 to L1.

In this matrix, as in the case of FIG. 3b, two LED's are connected in parallel opposition between each two transmission lines, this being the case, in FIG. 4a, for the following LED pairs: E1, E4; E2, E7; E3, E10; E5, E8; E6, E11; and E9, E12.

FIG. 4b shows the positions which switches S must have for activating each LED. In this embodiment, the position 1 of each switch places a positive potential on the associated transmission line, and thus corresponds to the electrical state H, while switch position 2 places a negative or ground potential on the transmission line, and corresponds to the electrical state L, and switch position 3 places the associated transmission line in an open-circuit state and corresponds to the "three-state". In this embodiment, state L corresponds to the combit value, which state H corresponds to the Logic 1 state and the electrical "three-state" represents Logic 0. Although the relationships existing in the circuit of FIG. 4a between the electrical states and the logic states could be interpreted differently, the above-stated correspondence has been selected because that switch S whose movable contact is in position 2 serves to select the group of LED's in which activation will occur, while for each of the other switches, placement of its movable contact in position 1 will produce illumination of its associated LED and placement of its movable contact in position 3 will prevent illumination of its associated LED, in the selected group.

Thus, LED E1 is addressed when, as shown in FIG. 4a, switch S1 takes on the position 2 so that its cathode control line is brought to the state L corresponding to the control value, switch S2 is placed in position 1 so that the anode control line of E1 is brought to state H, corresponding to Logic 1, and all other control lines L3, L4 are switched off from the transmitter in that switches S3 and S4 are in position 3 and are thus open, indicating the three-state, or Logic 0. Although a voltage is present across the antiparallel connected LED E4, that voltage has the inverse polarity, so that this LED E4 cannot light up. The cathodes of the LED's E5, E6 are brought into the high state via control line L2, and the cathodes of the other two LED groups E7 through E9 and E10 through E12 are brought into the "line open" state via control lines L3, L4, so that all of these LED's are prevented from lighting up.

If LED E2 is to light up, the address comes again via line L1, in that switch S1 of transmitter T is in position 2, switch S3 is brought into position 1 and switches 2 and 4 into position 3. Of all the LED's, only LED E2 has the correctly poled voltage and is thus the only one to light up, as is evident also from FIG. 4b which likewise shows the further required state combinations for individually lighting up the other LED's.

Practical embodiments of a display matrix having a structure corresponding in principle to that of FIG. 1, as for other devices according to the invention, will be constructed to assure that the diodes are supplied with current and voltage levels within those ranges which assure proper operation. This is achieved by proper selection of power supply output voltage and, if necessary, by the insertion of suitable current limiting devices.

In the receiver matrix, each diode is connected in parallel, and with the same polarity, with one or several series-connected diode pairs. For example, diode E1 is connected in parallel with the series arrangement of diodes E2 and E8 and in parallel with the series arrangement of diodes E3 and E11. Therefore, when diode E1 is excited, a voltage having the polarity required to effect excitation will also appear across each of the above-mentioned series-connected diode pairs. However, the latter diodes will not be excited by the voltage across E1 because the loading created by diode E1 and the voltage division across each diode pair will reliably assure that no diode of either diode pair will be supplied with voltage and current levels sufficient to effect excitation thereof.

The display matrix could be driven, by operation switches S in an appropriate pattern, to produce a multiplexed bar display, in which a number of adjacent diodes are excited in rapid succession, or a static "flying dot" display, in which any one selected diode is excited.

The arrangement illustrated in FIG. 4a suggests the possibility of employing the present invention in connection with the actuation of visual displays in such a manner that, by the addition of a small amount of coding circuitry at the transmission side of a connecting bus, the number of connecting lines required to drive a particular type of display can be substantially reduced. For example, a completely passive eight-digit, seven-segment display can be wired in accordance with the present invention to be operated via only eight connecting lines, whereas all known displays having this capacity require fifteen connecting lines. This thus represents a highly useful, although possibly not the most significant, application of the invention to a wide variety of data processing systems.

Figure 5A:
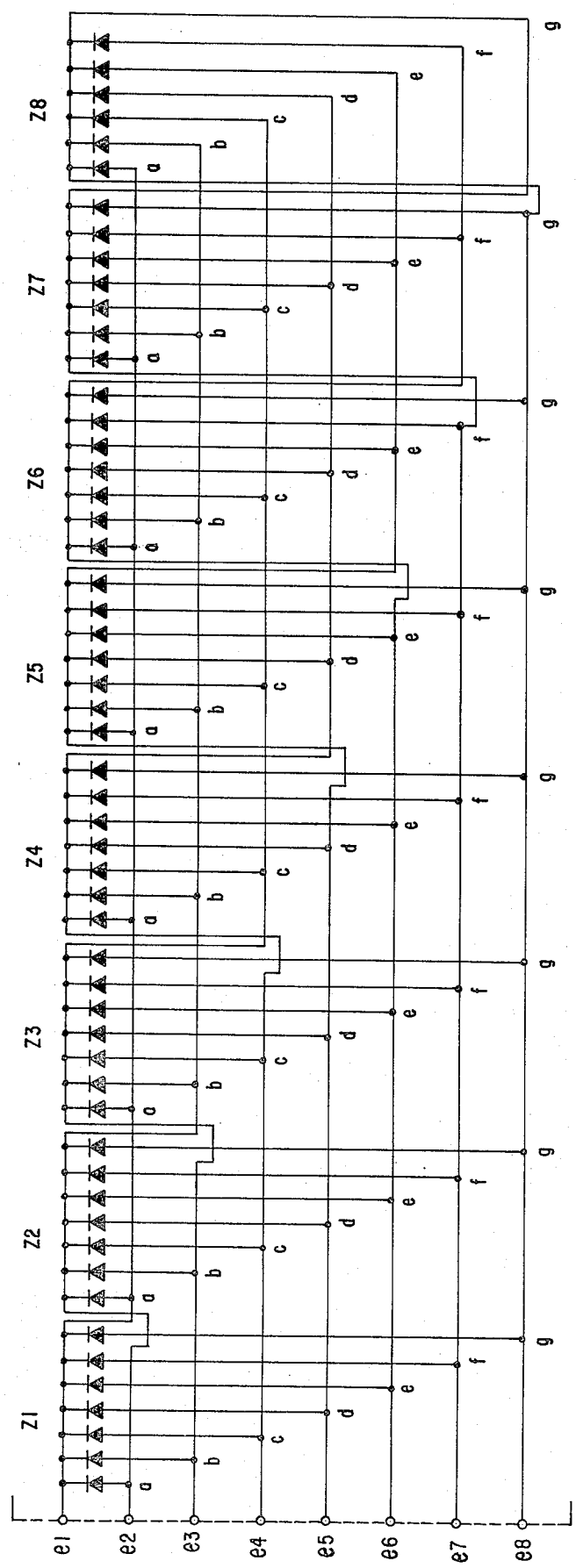
FIG. 5a is a similar diagram of a preferred embodiment of a passive, eight-digit, seven-segment display according to the invention.

FIG. 5a illustrates one embodiment of such a display constructed in accordance with the present invention. This display is composed of eight groups, Z1-Z8, each provided with seven light emitting segments, for example.LED's, and each arranged to display a respective decimal digit.

This display is driven by eight-bit comwords, with the bits of each successive comword being delivered in parallel to eight inputs e1-e8. The transmitter supplying these comwords is not illustrated, but is similar in principle to that shown in FIG. 4a, except that it is provided with eight switches, each switch having its movable contact connected to a control line leading to a respective one of the display inputs e. Of course, the use of a mechanical switch symbol in all of the Figures hereof is only for the purpose of illustrating the principles of operation of the invention, and in practice circuits would be constructed with electronic components performing the functions of those switches. A specific circuit arrangement for supplying suitable comwords to inputs e1-e8 of the circuit of FIG. 5a will be described in detail herein.

In FIG. 5a, the LED's are combined into groups Z of seven diodes. Within each group, all of the cathodes are connected together to a respective input e, while the anode of each diode in a group is individually connected to a different respective one of the further inputs.

Each group of LED's can display one respective decimal digit. FIG. 5d illustrates the spatial arrangement of the LED's associated with one digit. In accordance with a standardized designation, the seven LED's for each digit are arranged to constitute segments a, b, c, d, e, f and g. The same notation is employed in FIG. 5a to identify the activation line connected to the anode of the corresponding LED in each group.

A salient feature of the connection arrangement illustrated in FIG. 5a is that each input e serves as both the cathode line for all of the segments of one digit, and additionally as the anode supply line for a single segment in each of the other digits. It is this arrangement which makes it possible for the seven-segment display to be driven via only eight inputs. At the same time, this display can be driven in the same manner as prior art eight-digit seven-segment displays, according to a multiplex procedure in which each digit is activated in sequence while the selected segments of the activated digits are illuminated simultaneously. Stated in other terms, activation of the entire eight-digit display requires eight multiplex cycles, precisely as in the case of prior art displays of this type, with no reduction in actuation speed. Other activation techniques could also be used.

For driving this display, use is made of comwords containing one combit. The combit is represented electrically by the L state, while Logic 1 is represented electrically by the H state and Logic 0 is represented electrically by the three-state. The location of the combit in each successive comword thus determines the digit which is being selected, while the logic values at the other seven inputs determine the identity of the decimal digit which will be displayed. For example, if it were desired to display the decimal numeral "8" at display location Z1, input e1 would be placed at the electrical L state, which could be ground or a negative potential, thereby enabling all of the LED's of digit Z1. At the same time, the electrical H state would be applied to all of inputs e2 to e8, so that all of the LED's of digit Z1 would be illuminated, as is required to display the selected numeral.

Similarly, if it were desired to display decimal "1" at digit location Z2, input e2 would receive a signal representing the electrical L state, thereby enabling all of the LED's of digit location Z2, while a signal corresponding to the electrical H state would be applied to inputs e3 and e4 and a signal corresponding to the electrical three-state would be applied to inputs e1, e5, e6, e7 and e8.

Since, in the arrangement described above, only that input e which is connected to all of the cathodes of the selected digit location Z receives an electrical L state signal during any one multiplex phase, only the LED's associated with that location can be activated during the given phase. Since the electrical L state need be applied to only one input during any multiplex phase, it is possible to employ the same input to drive an individual LED at every other digit location. In effect, therefore, the novel system according to the invention makes possible a double use of each input to the display.

As has already been indicated above, the delivery of activating signals for the display of FIG. 5a can be effected according to a multiplex procedure which corresponds precisely to those employed for driving similar prior art displays.

Known eight-digit, seven-segment LED number displays are produced in accordance with thick film techniques or as printed circuits and are controlled by means of binary signal combinations and multiplex procedures which require 15 control lines and a corresponding amount of actuating function units. Since the space available in modules of this type is generally very limited, there exists the need, due to the relatively large number of lines, to install them with the smallest possible mutual spacing, but with such arrangement of the lines, short circuits occur frequently between the lines, leading to malfunctions.

In contradistinction thereto, the novel seven-segment number display shown in FIG. 5a requires only eight terminals, inputs e1 through e8, and eight internal lines so that with the same matrix dimensions, the spacing between the lines can be greater and the costs for material and manufacture are reduced.

By extension, a nine-digit, seven-segment display incorporating a floating decimal point would require only nine connecting lines and nine inputs, while a twelve-digit display of the same type would only require twelve connecting lines and inputs. In a directly analogous manner a planar screen viewer in the form of a matrix having 100×100 LED's would require, for driving the matrix in a line sequential manner, only 101 connecting lines and inputs, as opposed to the 200 control lines now employed. Here again, the time required to produce a complete image would be precisely the same as in known arrangements.

Figure 6A:
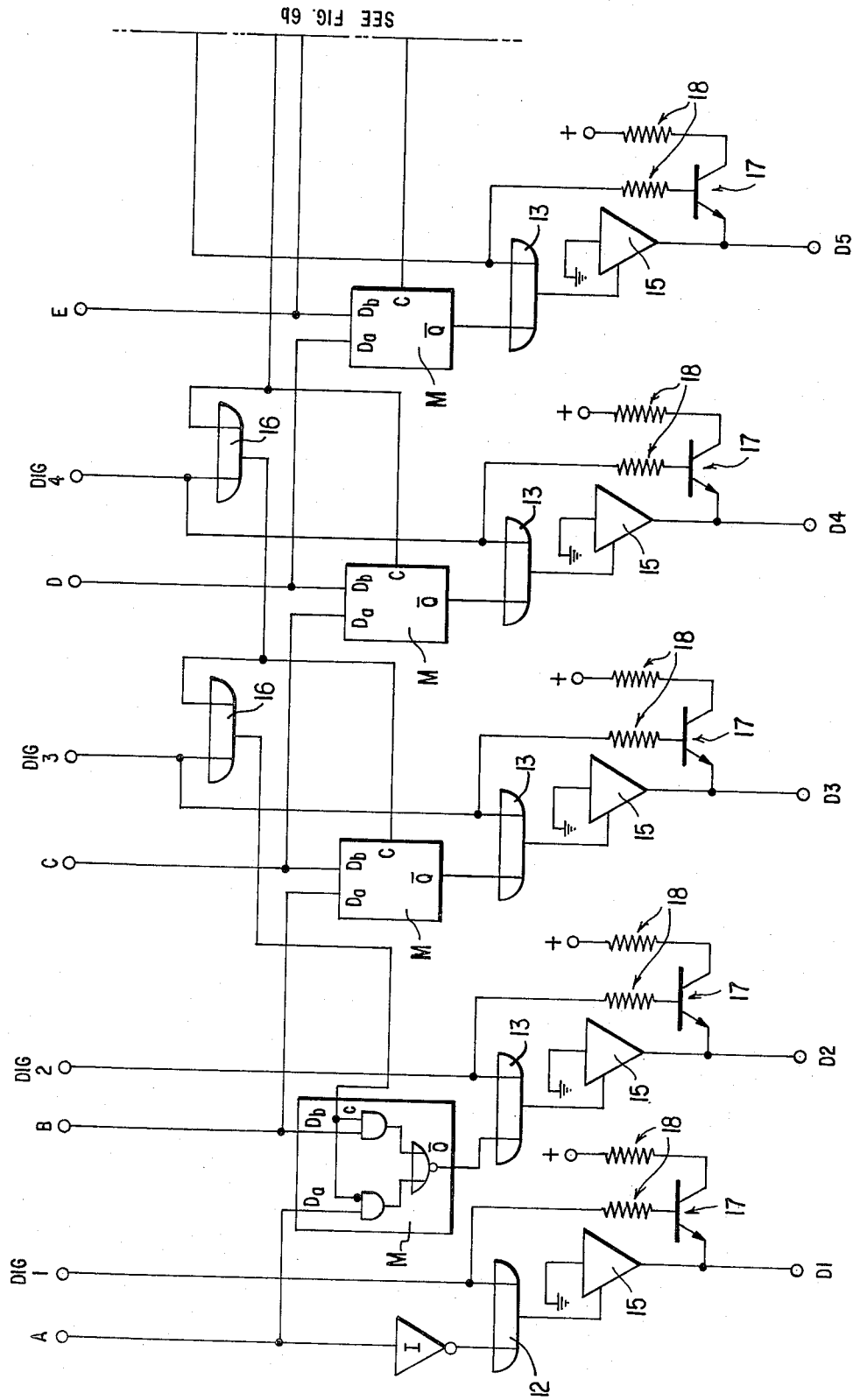
FIGS. 6A and 6B are a circuit diagram of a preferred embodiment of a signal coder according to the invention, for driving a nine-digit, seven-segment display with floating decimal point according to the invention.
Figure 6B:
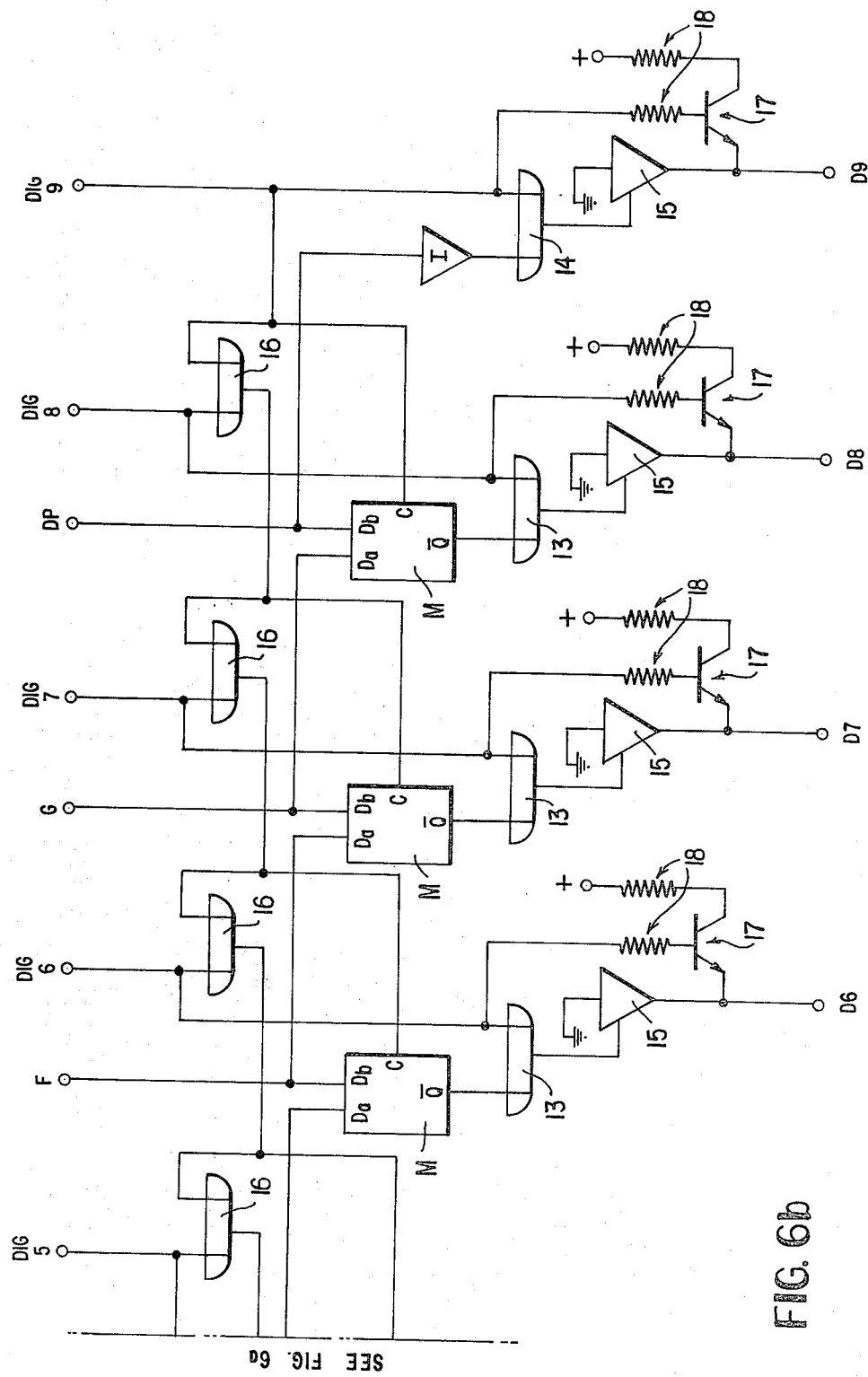

One embodiment of an information compressor, or comword coder, according to the present invention, for driving a display which essentially corresponds to that of FIG. 5a, except that it is constructed to drive a nine-digit display with floating decimal point and the polarity of all diodes is reversed, is shown in FIG. 6. This circuit can be connected directly between the numerical value and digit position decoders presently employed for driving such a seven-segment display and nine connecting lines connected to the inputs of a display constructed in the manner corresponding precisely to that shown in FIG. 5a, differing in that a ninth digit location will be provided and each location will include an eighth LED presenting a decimal point. The ninth input of such a display will be connected to the cathode of the decimal point LED of each of the first eight digit locations and to the anodes of all of the LED's of the ninth digit location, while the eighth input to the display will additionally be connected to the cathode of the decimal point LED of the ninth digit.

According to the present state of the art, the information for displaying digits is supplied by a first decoder which decodes successive binary words, which may initially be in binary-coded decimal form, into a parallel group of eight bits identifying the number to be displayed at a given digit location, together with the presence or absence of a decimal point. In order to select the digit location to which each such word is to be directed, there is additionally provided a one-of-nine decoder having nine outputs each connected via a respective control line for enabling the LED's associated with a respective digit location, an enabling signal appearing on only one of these control lines during each multiplex phase. The circuit illustrated in FIG. 6 will be disposed in the unit containing such decoders and will have its inputs A, B, C, D, E, F, G and DP (decimal point) connected to respective outputs of the segment value decoder. The inputs DIG 1 ... DIG 9 will, correspondingly, be connected to respective outputs of a one-of-nine digit location decoder.

Input terminal A is connected via an inverter I to one input of an OR-gate 12. The other input of gate 12 is connected to digit location selection input DIG 1, while the output of gate 12 is connected to the control input of a first three-state buffer 15 of a known type. Application of a positive potential to the control input of the buffer 15 will disconnect its output from its input, and thus place its output in a high impedance, or open, state, while application of a negative or ground potential to the buffer control input will supply the potential at the buffer input to its output. In the present circuit, the buffer input is connected to ground, which represents the electrical L state.

Segment input A is also connected to a first data input $D_a$ of a first two-input multiplexer M. The other data input $D_b$ is connected to segment input B. Multiplexer M is further provided with a control input c and the internal circuitry of multiplexer M is such that the binary signal value applied to control input c selects one of the data inputs for signal transmission to the multiplexer output $\overline{Q}$. As is shown for unit M connected to segment inputs A and B, absence of a positive potential at input c disables an AND-gate whose input is connected to data input $D_b$ and enables an AND-gate whose input is connected to data input $D_a$. If the signal at control input c constitutes a positive potential, the reverse condition is created. The outputs of the two AND-gates are connected to respective inputs of a NOR-gate, the output from which constitutes the output $\overline{Q}$ from the multiplexer.

The truth table for each multiplexer M is as follows:

| TRUTH TABLE MULTIPLEXER M | | | |
|---|---|---|---|
| $D_a$ | $D_b$ | c | $\overline{Q}$ |
| L | X | L | H |
| H | X | L | L |
| X | L | H | H |
| X | H | H | L |

X denotes that the input state has no influence on the output.

The two inputs to each of the multiplexers M are connected to a respective, successive pair of segment selection inputs A, B; B, C; C, D; ... G, DP. The output $\overline{Q}$ from each multiplexer M is connected to one input of a respective further OR-gate 13 whose other input is connected to a respective one of the digit selection inputs DIG 2–DIG 8.

The last stage of the circuit includes an additional OR-gate 14 having one input connected via an inverter I to decimal point selection input DP, the other input of gate 14 being connected to digit selection input DIG 9. The output of each of OR-gates 13 and 14 is connected to the control input of a respective three-state buffer 15 whose output is connected to a respective output terminal D supplying the digital display.

The coder is further provided with a group of OR-gates 16 each having one input connected to a respective one of the digit selection inputs DIG 3–DIG 8, while the other input of each gate 16 is connected to the output of the next succeeding gate 16, and in the case of the last gate 16 to the right, this second input is connected to digit selection DIG 9. The output of each gate 16 is also connected to the c input of a respective, associated multiplexer M.

Finally, associated with each three-state buffer 15 is a circuit composed of a transistor 17 and current regulating resistors 18. The collector-emitter current path of each transistor 17 is connected between a source of positive potential, representing the electrical H state, and the output of an associated buffer 15, while the base, or control electrode of each transistor 17 is connected to a respective digit selection input DIG.

Selection of the digit to be displayed is effected by placing one of the digit selection inputs DIG at the Logic 1 state. That state is conducted via the associated one of OR-gates 12, 13 and 14 to render the associated 17 conductive, thereby placing the associated output terminal D at the electrical H state, which corresponds, in this embodiment, to the combit state. The occurrence of the Logic 1 state at one of the digit selection inputs DIG also acts, via corresponding ones of OR-gates 16, to apply that state to the c input of each multiplexer M to the left of the activated DIG input. As a result, in each of those multiplexers, the signal state at its output $\overline{Q}$ is controlled by the signal applied to its input $D_b$. In the case of all of the other multiplexers M, their c input is receiving a signal representing the Logic 0 state, so that the signal state at their outputs $\overline{Q}$ is controlled by the value of the signal supplied to their input $D_a$.

Thus, the output signal for each OR-gate other than that gate which is connected to the activated DIG input is controlled by the signal appearing at the $\overline{Q}$ output of the multiplexer M connected to the one input of that gate. When the output signal from any one of those gates is a positive potential, or Logic 1 state, the associated buffer amplifier 15 will be open-circuited. Conversely, when the signal at the gate output corresponds to the Logic 0 state, the associated buffer amplifier 15 will assume a closed circuit condition, so that the signal at its input, which in this case is at ground potential, is transmitted to the associated output D. A Logic 0 output from each OR-gate 12, 13 or 14 will always correspond to the open-circuit state of its associated transistor 17, and will therefore always place ground potential on the associated output D. Thus, in the system in which the circuit of FIG. 6 is employed, the electrical H state corresponds to the combit state, or value, the electrical L state, or ground potential, represents Logic 1, and the open-circuit state, created when both the associated buffer amplifier 15 and the transistor 17 connected thereto are open circuited, corresponds to the Logic 0 state.

While one exemplary circuit arrangement for multiplexers M has been shown in FIG. 6, it will be appreciated that these multiplexers can equally be constituted by other circuit configurations which are already well-known in the art.

While the above description has made specific reference to LEDs, the techniques and circuit structures according to the invention can be utilized directly in conjunction with vacuum fluorescent displays, plasma displays, incandescent displays, etc.

Thus far, there have been described and illustrated passive receiver, or display, circuits embodying the invention. However, the invention can be applied with similar advantage to receivers capable of actively sensing the three different signal states which provide electrical representations of the bits of a comword. Such circuit arrangements must be provided with internal current voltage sources which permit a different signal state to be compared and distinguished. Circuits of these types will be referred to as "active receivers" and can be similar to passive receivers, with the difference that they will possess, as noted above, at least one internal energy source serving as internal power supply and/or reference signal source.

Such active receivers offer the advantage of increasing the possibilities for expansion of the information contained in comwords at the receiver location.

Figure 7:
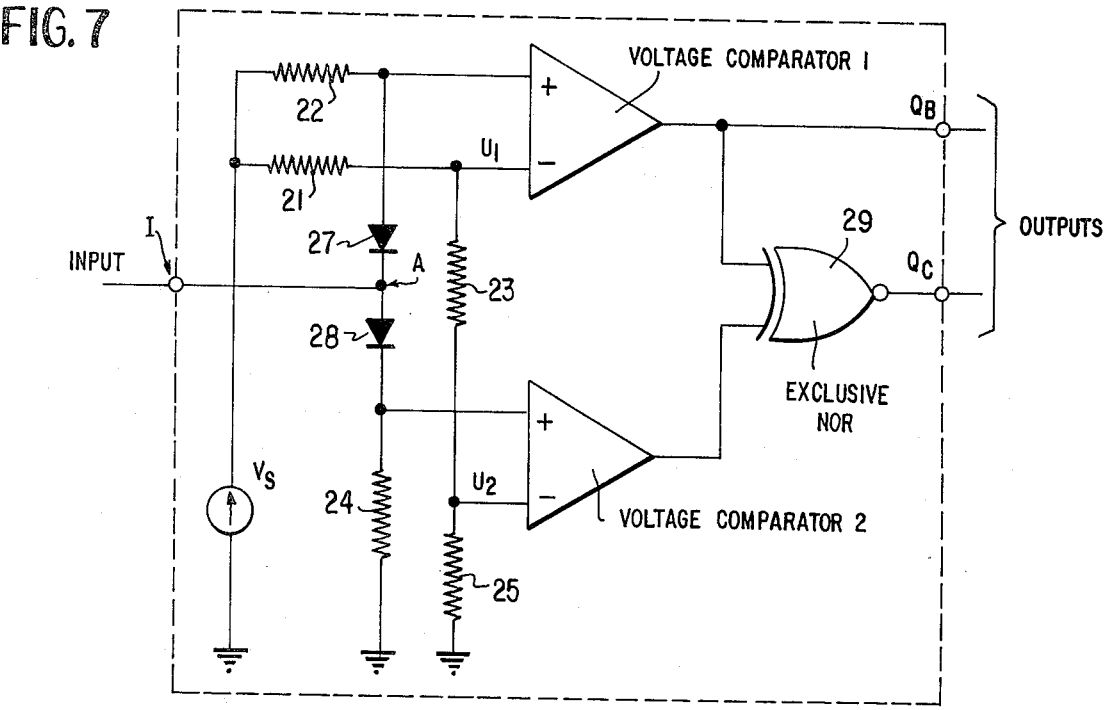
FIG. 7 is a circuit diagram of a preferred embodiment of an active receiver information expander module according to the invention.

FIG. 7 illustrates one embodiment of an information expander module capable of receiving one bit of a comword and producing an output in the form of two parallel bits unambiguously defining the state represented by the input signal. The module includes voltage comparators 1 and 2, a source of a supply voltage $V_s$ and two voltage divider networks defining the input voltage levels to both inputs of each comparator. Each voltage divider is connected between the supply voltage $V_s$ and ground. A first voltage divider network includes resistors 21, 23 and 25, with the connecting point between resistors 21 and 23 being connected to the inverting input of comparator 1 and the connecting point between resistors 23 and 25 being connected to the inverting input of comparator 2. The second voltage divider network includes resistors 22 and 24 and two ordinary diodes 27 and 28 connected in series between resistors 22 and 24 and both poled to be forward conducting with respect to the supply voltge $V_s$. The input I of the circuit is connected to a terminal A between diodes 27 and 28. The point of connection between resistor 22 and diode 27 is connected to the non-inverting input of comparator 1, while the point of connection between diode 28 and resistor 24 is connected to the non-inverting input of comparator 2.

The output of comparator 1 provides the first output $Q_B$ of the module, and the outputs of both comparators are connected to respective inputs of an EXCLUSIVE NOR-gate 29 whose output constitutes the second output $Q_C$ of the module.

In operation, if the connecting line supplying input I is open-circuited, i.e. carries a representation of the three-state, approximately the same voltage appears at the high inputs of both comparators in that resistors 22 and 24 substantially completely define the voltage division operation performed by the voltage divider of which they form a part. Under these conditions, the values of resistors 22 and 24 will have been so selected that the substantially identical voltage applied to the high inputs of comparators 1 and 2 is lower than potential $u_1$ and higher than potential $u_2$. Therefore, the output from comparator 1 will constitute the electrical L state and the output from comparator 2 will constitute the electrical H state.

When signal on the line connected to input I has the electrical H state, the voltage at point A, and thus at the non-inverting input to comparator 1, will be raised to a value greater than $u_1$. The voltage applied to the non-inverting input of comparator 2 will continue to be higher than $u_2$. Accordingly, the output signals from both comparators will represent the electrical H state.

Finally, when the line connected to input I carries the electrical L state, the voltage at point A will be pulled down to a value such that the voltage at the non-inverting input of each comparator is lower than that at its associated inverting input, whereupon the output signals from both comparators will be at the electrical L state.

The value of the signal at output terminal $Q_B$ of the circuit will always correspond to that at the output of comparator 1. On the other hand, the signal appearing at circuit output $Q_C$ will be at the electrical H state only when the output from one comparator constitutes the electrical L state and the output from the other comparator constitutes the electrical H state. Otherwise, the output $Q_C$ will be at the electrical L state.

The truth table for the circuit of FIG. 7 is as follows:

| TRUTH TABLE FOR CIRCUIT OF FIG. 7 | | |
|---|---|---|
| State of input I | $Q_B$ | $Q_C$ |
| H | H | L |
| Three-state | L | H |
| L | L | L |

Thus, the signal at output $Q_C$ defines the presence of a three-state signal at input I, while the signal state at output $Q_B$ defines, when the signal at output $Q_C$ is at the L state, the presence of an H state or an L state at input I. For the usual applications of the module of FIG. 7, the H, L and the three-states at input I will correspond to Logic 1, Logic 0 and combit state, respectively.

Such a module can be employed as a basic cell of a multiline receiver/decoder, permitting systems according to the invention to be applied in practically every field of digital data processing.

One particular feature of an active receiver is that it will most often cooperate with a comword-to-binary converter. The main function of such a converter will be to convert comword coded data into its original binary form, with the combits separated out. This will enable the resulting information to be made entirely compatible with standard digital circuitry designed for receiving binary coded data. Such a conversion must consist of two independent steps: separation and decoding of the information carried by the combit, or combits; and selection and compression of information carried by the conventional bits.

Figure 8:
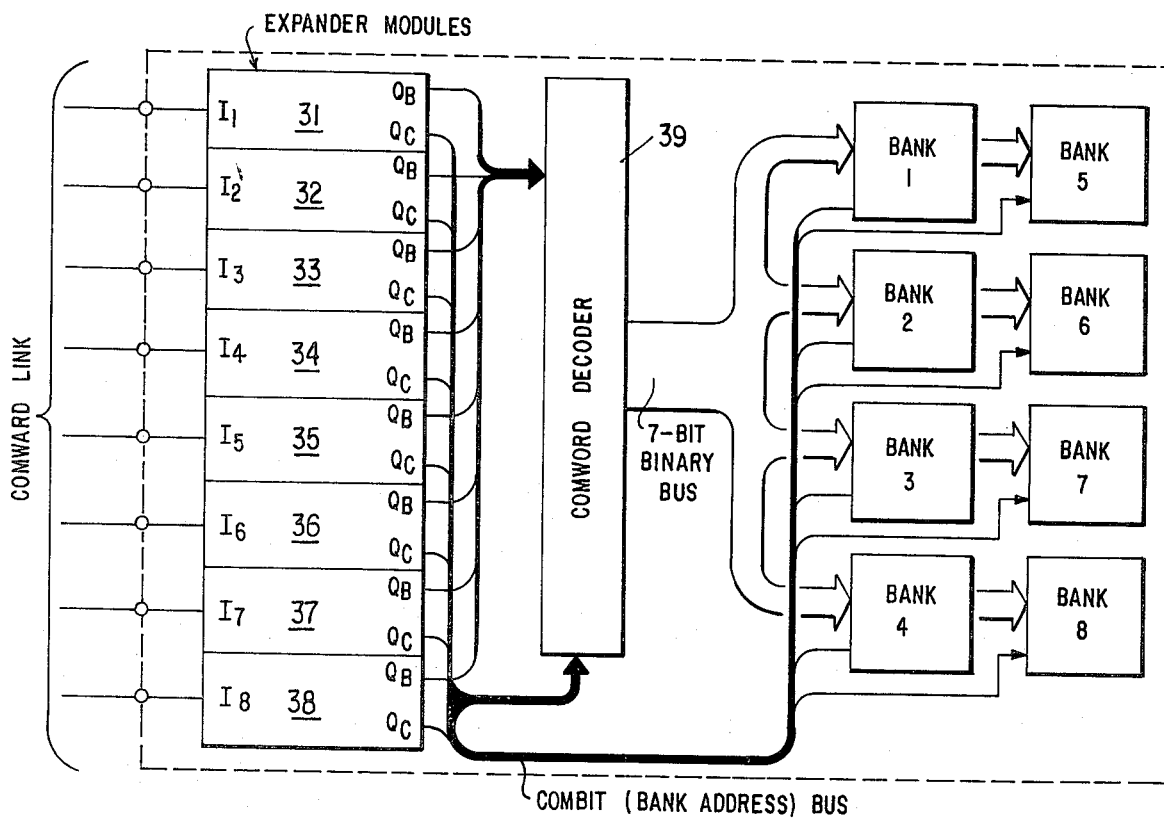
FIG. 8 is a block circuit diagram of an active receiver according to the invention for addressing a plurality of memory locations.

One example of a practical utilization of an active receiver according to the invention is illustrated in FIG. 8, which illustrates such an active receiver arranged to address a number of memory locations. The specific circuit illustrated is arranged to be controlled by eight-element comwords supplied to respective inputs via a comword link composed of eight transmission paths. The receiver includes eight expander modules 31–38, each identical in structure to the module shown in FIG. 7. Each element of a comword is supplied to the input I of a respective module. The $Q_C$ output of each module is connected to a respective one of eight data banks 1–8. The system is arranged to be employed with comwords containing a single combit represented electrically by the three-state. Therefore, for each received comword, the output $Q_C$ of only one of the modules 31–38 will provide an electrical H state signal, and that signal will act to address a respective one of the memory banks. Each bank contains up to 128 memory locations, and the location in any one bank can be addressed only if that bank has itself been addressed by an H state signal from the $Q_C$ output connected thereto. The addressing of any one of 128 memory locations requires a seven-bit binary address word. Such a word can be derived from the $Q_B$ outputs of the eight modules 31–38 since seven of the transmission paths feeding the receiver carry binary bit signals in each comword. All of the $Q_B$ outputs of the modules 31–38 are connected to respective inputs of a comword decoder unit 39, which unit is also connected to receive all of the $Q_C$ outputs of the modules 31–38. Within the decoder 39, those elements of each comword which constitute binary address bits are extracted and applied to a seven-bit binary bus feeding each of memory banks 1–8 in parallel. A seven-bit binary signal on this bus will correspond to one memory location in each memory bank. However, only that memory bank which is receiving an H state signal from one module output $Q_C$ can have its memory locations addressed.

Since each memory bank can contain 128 memory locations, it is possible, with the circuit of FIG. 8, to address any one of 1,024 memory locations by means of each 8-element comword. If it were desired to address this number of memory locations with conventional binary words, it would be necessary to provide 10 input lines.

Figure 9:
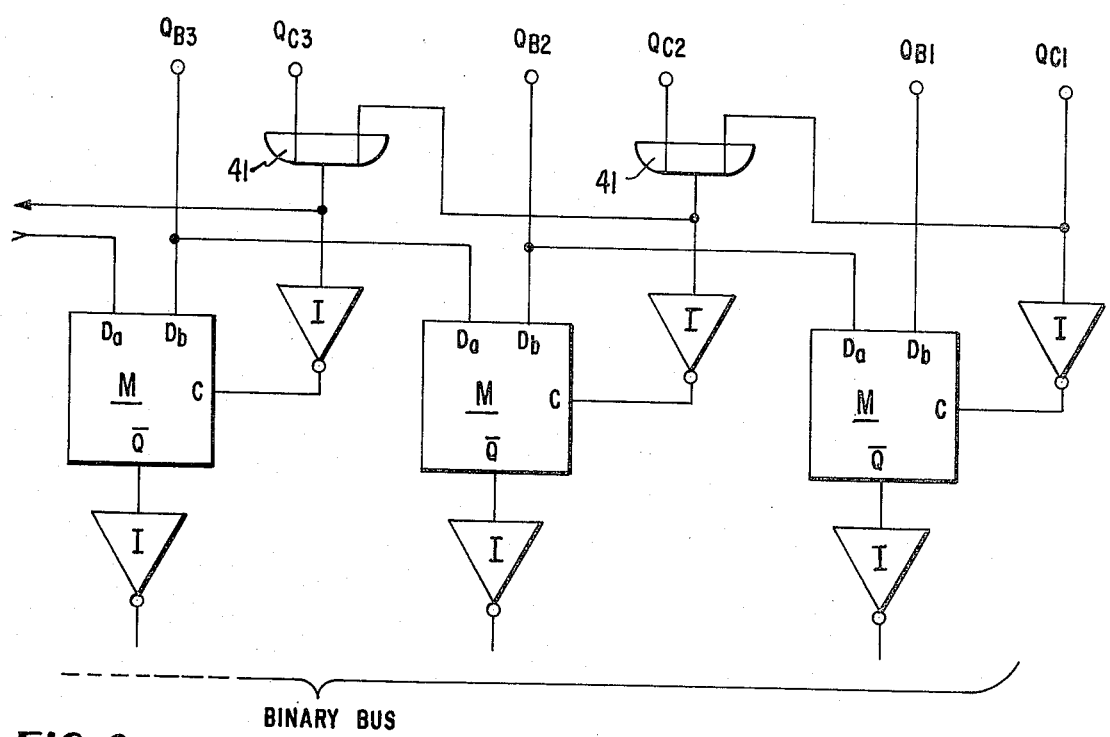
FIG. 9 is a circuit diagram of one preferred embodiment of the decoder unit of the circuit of FIG. 8.

A portion of one suitable embodiment of decoder 39 is shown in FIG. 9, the construction of this circuit being based on principles similar to that underlying the construction of the circuit of FIG. 6.

In the circuit of FIG. 9, use is made of a plurality of two-input multiplexers M identical in structure and operation to the multiplexers M of FIG. 6. The control input c of each multiplexer M is connected, via a respective inverter I, to the output $Q_C$ of a respective expander module, while the $Q_B$ output of the same module is connected to the $D_b$ multiplexer input. The $D_a$ input of each multiplexer M is connected to output $Q_B$ of the next succeeding module. Associated with each multiplexer M after the first, is an OR-gate 41 having its inputs connected, respectively, to the $Q_C$ output of the associated expander module and the $Q_C$ outputs of all preceding expander modules. The output $\bar{Q}$ of each multiplexer M is connected, via a respective inverter I, to a respective line of the 7-bit binary address bus. For the sake of simplicity, only three multiplexers M and their associated circuitry are shown in FIG. 9. The total number of such units will be equal to the number of lines in the binary address bus. The $D_a$ input of the last multiplexer M will be connected to the $Q_B$ output of the last expander module, in the case of FIG. 8 this being module 38. The signal at the $Q_C$ output of module 38 is not required for controlling the decoder 39 since the H state will appear at that output only when input $I_8$ is receiving a comword, in which case the binary address bits are provided at the outputs of the first seven modules 31–37.

Of course, the comwords supplied to the circuit of FIG. 8 could be generated from the signals appearing on memory bank control lines and memory location address words, as employed currently in the art, by a comword generating circuit such as that shown in FIG. 6.

Thus, the basic functions performed by a circuit of the type illustrated in FIG. 8 separate the information represented by a combit, or combits, from conventional binary data. The combit information is essentially represented by its position in the array of connecting lines extending from one circuit unit to another, while the conventional binary data information is determined by the sequence of conventional bit signals across the array of connecting lines, the precise identity of the line carrying each conventional bit signal not being of significance.

The embodiment shown in FIGS. 8 and 9 enables an 8-element comword to selectively address any one of 1,024 memory address locations employing comwords containing a single combit. In a directly analogous manner, systems could be constructed according to the present invention employing two or more combits per comword and this would permit a substantial increase in the number of memory locations, or receiver devices which could be selectively actuated, still without increasing the number of transmission paths. For example, in an 8-line system having the general form shown in FIG. 8, the use of comwords having two combits would provide the possibility of selecting any one of 28 different memory banks, each containing 64 memory locations, this being the total number of locations which can be addressed by a 6-bit binary address word. Such a system would have the capability of selectively addressing any one of $64 \times 28 = 1,792$ address locations by means of a comword whose elements are transmitted in parallel over only eight transmission paths.

The increase in the number of memory locations which could be directly addressed by a single comword transmitted in parallel becomes even more dramatic as the number of transmission paths increases. Thus, for example, if a total of twelve transmission paths were provided, and each comword contained four combits, it would be possible to select, by means of each comword, any one of 126,720 memory locations, compared to 4,096 locations which could be directly addressed by a 12-binary address word.

Figure 10:
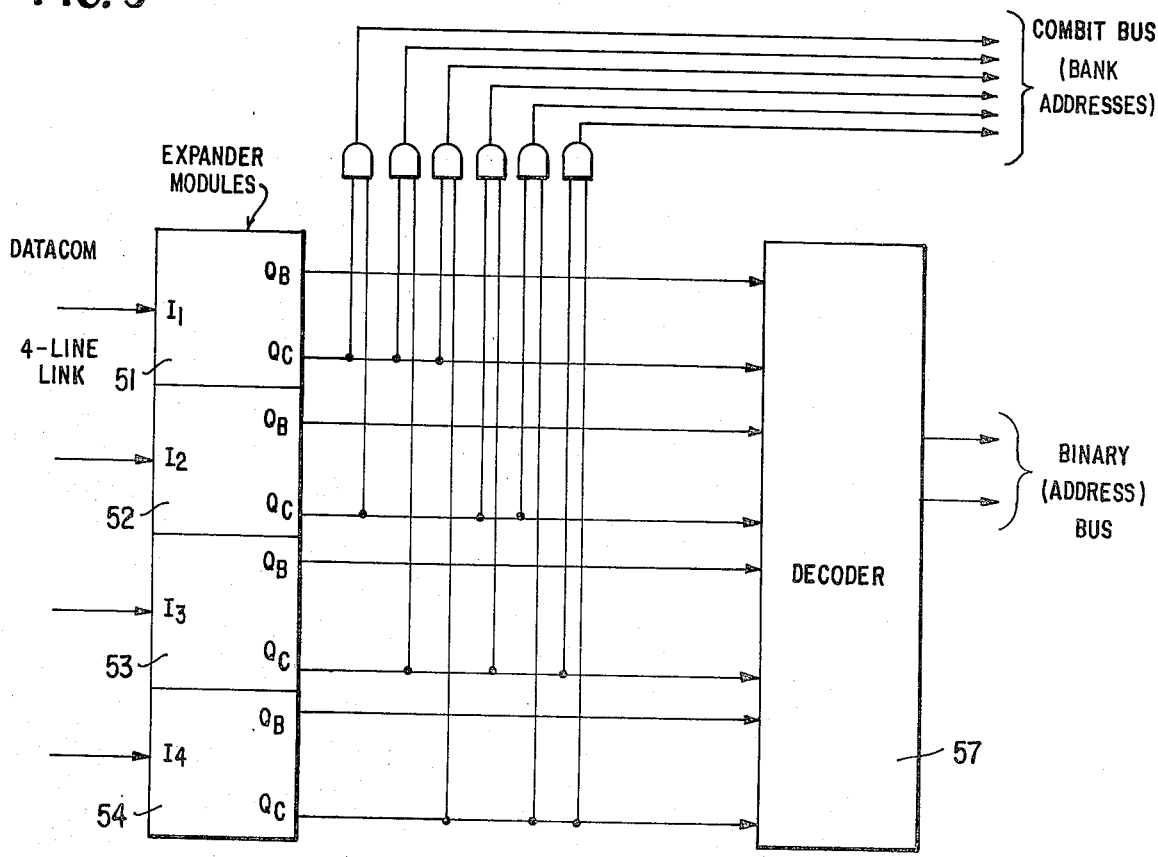
FIG. 10 is a block circuit diagram of a second embodiment of an active receiver according to the invention, for addressing a plurality of locations of a memory.

An example of an active receiver embodiment employing more than one combit in each comword is shown in FIG. 10 with reference to a system employing four transmission paths and, correspondingly, four information expander modules each of the type shown in FIG. 7. The $Q_C$ outputs of the four modules 51-54 are connected in every possible pair to 6 AND-gates which together constitute a 2-of-4 decoder. The output from each AND-gate is connected to address, or enable, a respective memory bank, while the binary information contained in each comword is recovered in a decoder 57 and is delivered to a binary address bus to address a selected location in the selected memory bank. While this specific arrangement offers only a slight improvement in that it enables 24 memory locations to be addressed, as compared to a capacity of 16 locations for conventional, 4-bit binary words, the same principle can be applied to systems utilizing a larger number of parallel transmission paths, with attendant substantial increases in memory location addressing capacity.

Generally stated, the number of address locations which can be addressed by a comword having a given number of elements and a given number of combits is defined by:

$$2^{N-M} \cdot \frac{N!}{M!(N-M)!}$$

While a number of specific systems embodying the invention have been described, it should be noted that the principles of the present invention can be employed for transmitting virtually any type of digital information. The applicability of the invention for combining control information designating groups of components, e.g. display elements, memory banks, etc., with information selecting one or more components in the selected group can be readily appreciated from the preceding disclosure, as can the specific techniques which could be employed to convert such information into comwords at a transmitting unit, and to then recover the information by expanding such comwords at the receiving unit.

However, the invention is applicable to a wide variety of other situations, and could even be employed to reduce the number of lines needed to transmit information representing binary data words. For example, 10-bit binary words could be compressed into 8-comwords at a transmitting unit, and the resulting comwords could be transmitted over eight transmission paths and expanded back into the original 10-bit binary words at a receiving unit. For converting such a 10-bit word into a corresponding eight-element comword, use could be made essentially of the circuit illustrated in FIG. 6, with the circuitry between input DIG 9 and output D9, and the last OR-gate 16 and multiplexer M to the right, and input DP omitted, and with an inverter connected between input G and the left-hand input of the last OR-gate 13 to the right. Then, the seven least significant digits of a 10-bit binary word would be applied directly to respective ones of inputs A, B, C . . . G. The three most significant bits of that word would be supplied to a 1-of-8 coder having eight outputs each connected to a respective one of the inputs DIG 1, DIG 2 . . . DIG 8. This coder would be constructed, in a manner well-known in the art, to supply an H state signal to only one of its outputs, depending on the value of the binary combination represented by the three most significant bits of the data word. For example, if those three bits had the value 000, an H state signal would be applied by the coder to input DIG 1. Correspondingly, if the three most significant bits of the binary word had the value 111, an H state signal would be applied to input DIG 8.

Figure 11:
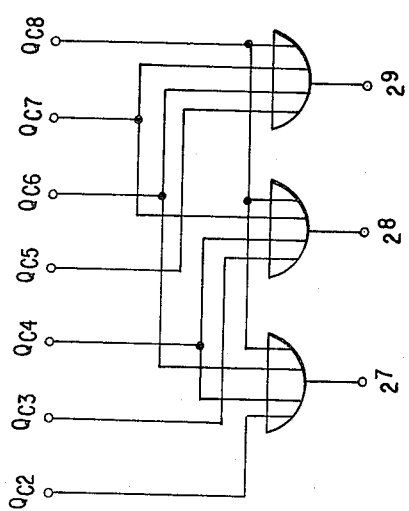
FIG. 11 is a circuit diagram of a circuit unit for use in an active receiver according to the invention for processing data words.

The resulting comword would then be transmitted from outputs D1-D8 to a receiver which could be composed of eight expander modules and a comword decoder having the form shown in FIGS. 8 and 9. This circuit would separate the comword elements representing data bits from the combit and would place the data bits at the first seven locations of a 10-bit binary data bus. The combit would be applied to a decoding circuit in a manner to recover the value of the three most significant bits of the original ten-bit data word. Such a decoder could be constituted in a very simple manner of three OR-gates connected to the expander module outputs $Q_{C2}$-$Q_{C8}$ in the manner illustrated in FIG. 11. It will be noted that the output $Q_{C1}$ of the expander module associated with the least significant comword element need not be connected to this decoding circuit because a combit at that output will correspond to a value of 000 for the three most significant bits of the binary data word. The outputs of the OR-gates shown in FIG. 11 are connected to the three corresponding lines of the 10-bit binary data bus.

Stated in general terms, for any specific utilization of the invention, a multi-bit word is coded into a N-element comword, where N is smaller than the number of bits in the original word, by deriving from the multi-bit word an (N−M) bit word and the inserting at one or more locations between those bits, M combits. Then, at the receiver, the combits are extracted from the comword and decoded, while the (N−M) binary bits are recovered and placed, while retaining their original sequence, on (N−M) signal lines.

In conjunction with utilization of the invention to "compress" binary data words, arithmetic operations, such as addition, can be simplified by carrying out such operations on the comwords derived from two such binary words, rather than on the binary words themselves. In this procedure, the binary bits contained in the two comwords would be added in the usual binary manner, as would the binary representations of the combits. With this procedure, even a simple operation of adding two words can produce an increase on 100% in the capacity of the adding circuit and/or in the computing speed.

One significant advantage of the present invention resides in its ability to be rendered compatible with existing digital units. For example, an active receiver having the form shown in FIG. 8, and capable of addressing 1,024 read-only memory locations by means of 8-element comwords could be constructed as an integrated circuit which would functionally become pin-to-pin compatible with the standard TTL 74287 bipolar mask-programmable memory which is presently capable of having only 256 locations addressed. If the circuit were modified to respond to comwords containing two combits, the memory unit could be constituted by 28 banks each containing 64 memory locations, resulting in a total of 1,792 addressable locations. As an another example, a unit having the general form shown in FIG. 8 but provided with 10 input terminals and a corresponding number of expander modules can be provided with 15,360 memory locations and be made directly compatible with a 2708 PROMIC IC which has a maximum of 1,024 addressable memory locations. However, the external layout of the integrated circuit, in terms of number and location of all pins, would be the same, the only difference being the form of the word transmitted to such unit. Conversely, if it were desired to only provide a capacity for addressing 1,024 locations, a memory unit according to the present invention could be provided with two less input pins.

According to further applications of the present invention, a number of individual circuit units could be provided with means for both converting conventional binary words into comwords and comwords back into conventional binary data words, which would permit a high degree of flexibility in the exchange of data between such units, with transmission in both directions between two units taking place over the same transmission bus. Such a system will offer significant advantages with respect to both the efficiency and speed of processing operations.

Systems according to the invention can be applied not only to circuit units containing ROM's, but also to those provided with RAM's or recirculating memories.

The invention could be applied to microprocessors provided with circuitry for both converting binary information into comwords and comwords back into binary information, which circuitry, as a whole, could be described as a comword compander. This unit would be connected at the Address/DATA I/O bus of such a microprocessor and could serve to significantly increase the data processing power of such a device.

According to another possibility offered by the invention, a comword decoder can be associated with a small, specially constructed ROM which will act as a combit decoder and will be addressed directly by the combits contained in a comword. The information contained in the conventional bits of such a comword would then be employed to address a selected location within the selected memory bank. As one example, use could be made of a comword containing two combits and a total of six elements. The combit lines of a comword detector would all be connected to a ROM bank decoder which would perform a 2-of-6 coding operation and would produce a 4-bit bank address which can have any one of 15 different values for addressing 15 different memory regions.

The invention could also be embodied in separately manufactured interface devices capable of being connected to conventional data processing units for converting digital signals into comwords and/or comword into the original digital signals. Such interface devices could serve to directly adapt a wide variety of existing data processing systems and units for operation according to the invention, permitting, in particular, a reduction in the number of lines in the various connecting buses.

The invention could also be applied to various types of data processing input interfaces, such as keyboard entry coders/decoders and "code-to-ASCII" encoders, etc.

Figure 5B:
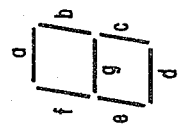
FIG. 5b is a pictorial representation of one digit of the display of FIG. 5b.

It has already been pointed out that the invention can be utilized for reducing the number of lines needed to drive a wide variety of displays, including "flying dot" and bar displays. Furthermore, the invention could be employed for decoding 8-bit ASCII inputs in order to directly drive point displays, such as for example, a 6×7 matrix alphanumeric LED display. Devices according to the invention could also be constructed to drive, for example, incandescent, electrically heated display elements of the type having a diode in series with the heater, the elements being arranged in arrays of the type illustrated in FIGS. 4 and 5.

Figure 12:
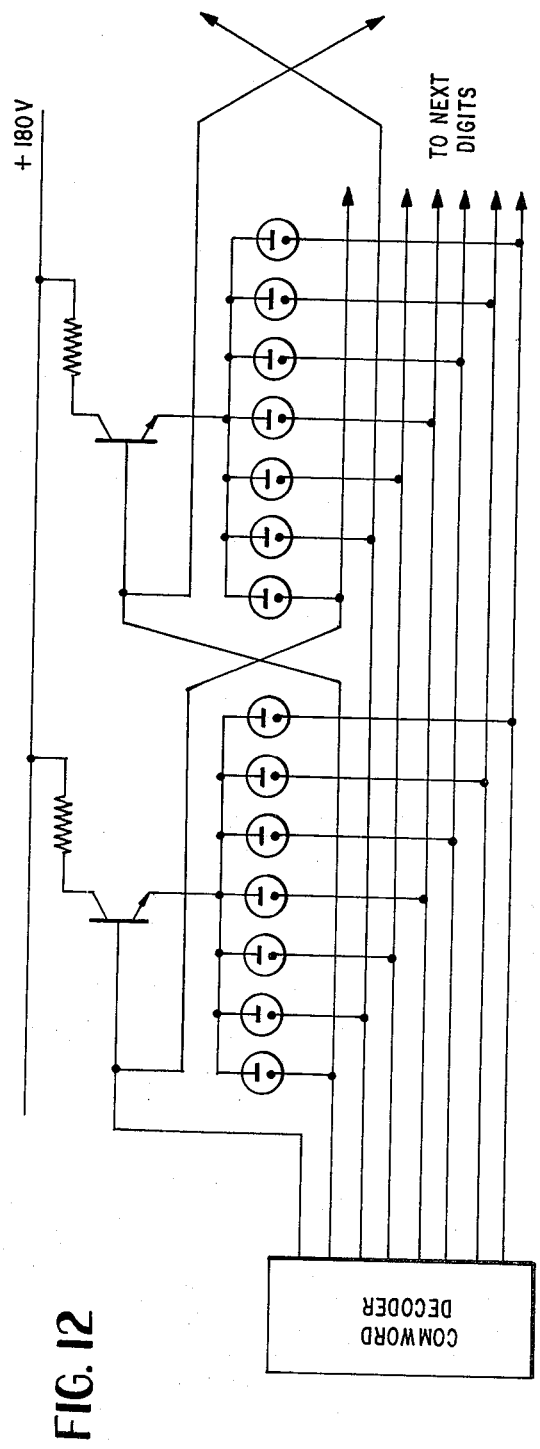
FIG. 12 is a circuit diagram of a receiver according to the invention containing a display network.

The invention could further be applied to displays utilizing gas-discharge elements requiring a relatively high driving voltage. For this purpose, each group of display elements could be connected to a separate power supply via a switching transistor whose switching state is controlled by a respective element group selecting line. For example, if a group of such devices were connected in an array comparable to that illustrated in FIG. 5, the line controlling the activation of, or enabling, each group would be connected, rather than to one side of the associated group of discharge devices, to the base of a transistor whose current path is connected between a supply voltage source and one side of each element of the group. Thus, for example, referring to FIG. 5a, the first group of such elements would be enabled by connecting input e1 to the base of a transistor connected between a supply voltage source and a common connection to one side of all of the display elements of that group. Input e2 would similarly be connected to the base of a second transistor connected to one side of the second group of display elements. One embodiment of such an arrangement is illustrated in FIG. 12. The comword decoder shown therein could, again, be constructed in the manner illustrated in FIG. 6. Such a display offers a number of advantages, primarily because it produces high brightness levels, with low power consumption, and is suitable for large screen displays.

In the circuit of FIG. 12, each decoder output line is connected to the base of the drive transistor for a respective group of gas discharge elements and to the other side of one such element of each other group, these connections being effected, in each line, via suitable signal decoupling and current limiting resistors.

Figure 13:
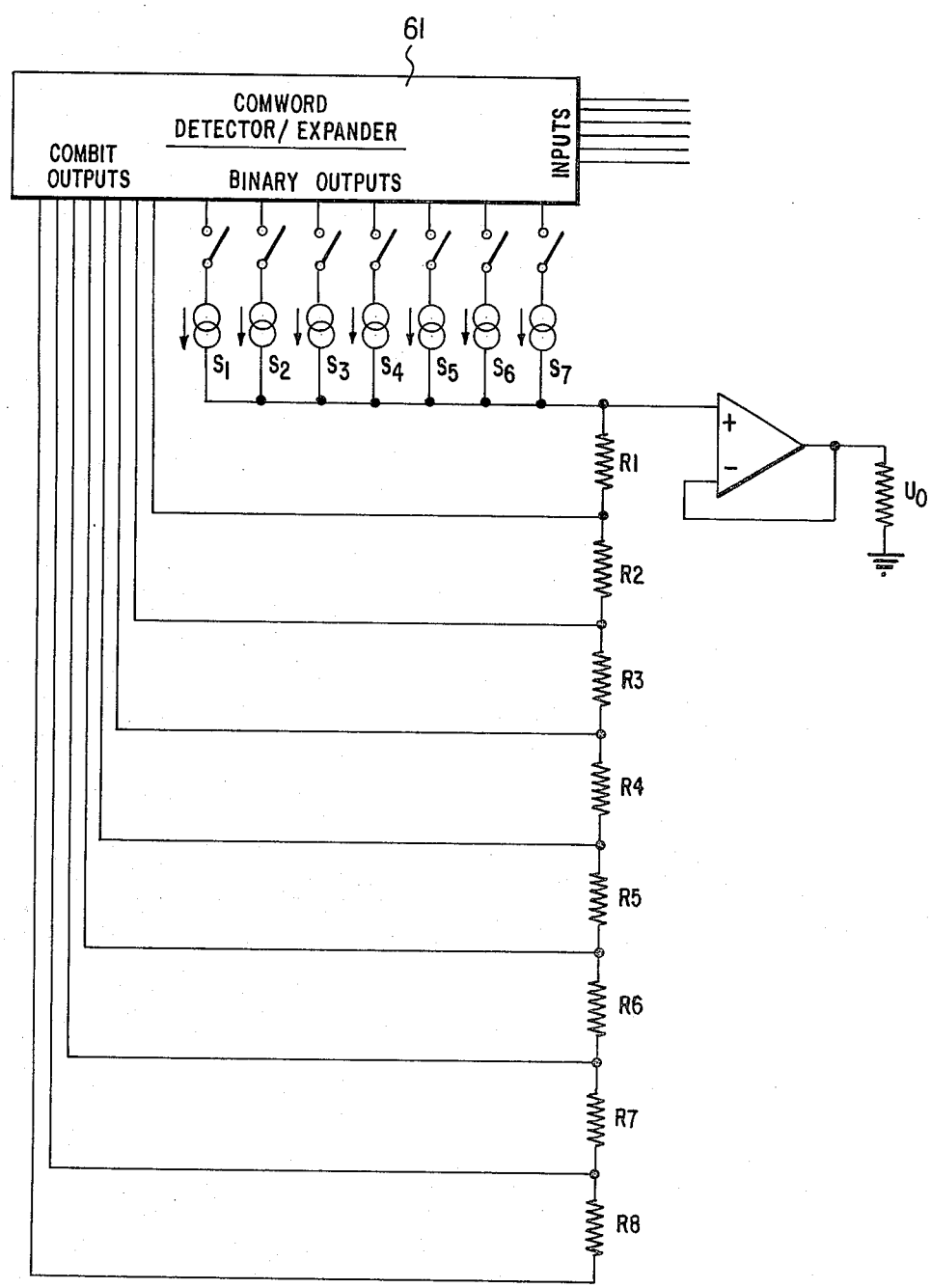
FIG. 13 is a circuit diagram of a preferred embodiment of a D/A converter according to the invention.

The principles of the present invention can also be applied to the field of D/A and A/D converters, as well as voltage and current synthesizers, codecs, etc. D/A and A/D converters can, in particular, be made directly compatible with comword information representations. One embodiment of a D/A converter of this type is illustrated in FIG. 13 and includes a comword detector-/expander 61 which could be constituted by modules 31–38 and decoder 39 of the circuit of FIG. 8. The seven binary bits produced at the output of the decoder are applied as switching signals to activate selected current sources $S_1 \ldots S_7$. The current provided by each source, when it is activated by a corresponding binary bit value, has twice the amplitude as the current emitted by the immediately preceding source. The combit outputs from unit 61, corresponding to the $Q_C$ outputs from modules 31–38 of FIG. 8, are each applied to a respective point of a voltage divider composed of a series arrangement of eight resistors R. The active combit output will connect its associated voltage divider point to ground, or back to the other side of the array of current sources. With this arrangement, the current supplied by the sources will be determined by the value of the binary word at the binary outputs, while the resistance between the corresponding operational amplifier input and ground will be dictated by active combit output. The circuit shown in FIG. 13 is constructed to operate in response to comwords containing a single combit. In order to cause the combit outputs to connect associated points of the voltage divider to ground, it would only be necessary to use each $Q_C$ module output to control the conductive state of a transistor connected between that voltage divider point and ground. The larger the number of resistors R connected effectively between the non-inverting operational amplifier input and ground, the higher is the voltage supplied to that input, and thus the higher the voltage appearing at the operational amplifier output. Such an arrangement could be employed for direct integration of the analog representation of a sequence of comwords, an operation which has heretofore been complex and difficult.

Conceivably, an A/D converter operating according to a similar principle could be constructed.

It will thus be seen that the novel system according to the present invention is applicable to an extraordinarily wide variety of digital signal processing devices and, in fact, no specific digital device to which the system would not be applicable has been encountered.

It will be understood that the above description of the present invention is susceptible to various modifications, changes and adaptations, and the same are intended to be comprehended within the meaning and range of equivalents of the appended claims.

What is claimed is:

1. A digital information transmission device for combining the information contained in a first input signal having a plurality of bits and the information contained in a second input signal having any one of a given number of different values into a combined signal having a number of elements greater than the first plurality of bits and less than the sum of the first plurality of bits and the number of bits required to represent all values of the second input signal, comprising: means presenting a plurality of output terminals equal to the number of elements in the combined signal and each having a respective position relative to the other terminals; signal processing means connected for receiving, in parallel, the first plurality of bits and the second input signal and for supplying, in parallel, to each said output terminal, a signal state representing either one of two binary values or a signal state different from either binary value signal state, said signal processing means including means for supplying the different signal state to at least one selected output terminal the relative position of which corresponds to the value of the second input signal, and means for supplying to each of a plurality of said output terminals, other than the at least one selected output terminal and equal in number to the first plurality of bits, a signal state representing the binary value of a respective one of the first plurality of bits; a plurality of first input terminals each arranged to supply one bit of the first input signal; and a plurality of second input terminals each corresponding to a respective output terminal and each supplying a signal when the value of the second input signal is such that the different signal state is to be supplied to the corresponding output terminal, and wherein said signal processing means include a plurality of circuits units each having inputs connected, respectively, to one respective second input terminal and two respective adjacent first input terminals and an output connected to a respective one of said output terminals for supplying to said respective output terminal the different signal state when a signal is supplied by said respective second input terminal and a signal state representing the binary value of the bit supplied to a selected one of said respective adjacent first input terminals when no signal is supplied by said respective second input terminal; each said circuit unit being arranged to select that one of said adjacent first input terminals whose bit it represented by the signal state at said respective output terminal as a function of the presence of a signal at a said second input terminal corresponding to an output terminal preceding said respective output terminal in position.

2. A system as defined in claim 1 wherein said signal state different from either binary value signal state is constituted by a high series impedance at the associated output terminal.

3. A system as defined in claim 2 wherein the high series impedance is constituted by an open-circuit condition at the associated output terminal.

4. A transmission device as defined in claim 1 wherein the number of different values of the second input signal is greater than the number of said output terminals, and said means for supplying the different signal state is connected to supply the different signal state to a selected number of said output terminals the relative positions of which correspond to the value of the second input signal, the selected number of output terminals being related to the total number of said plurality of output terminals such that all possible combinations of the selected number out of the total number of said output terminals is at least equal to the number of different values of the second input signal.

5. A digital information receiving device arranged to receive a signal composed of a plurality of elements arriving in parallel via a plurality of transmission paths each having a respective position, each path carrying a respective signal element and each signal element constituting either one of two signal states each representing a respective binary value or a signal state different from either binary value signal state, said device comprising: a plurality of input terminals each connected to a respective transmission path; and signal separating means connected to said input terminals for producing a first set of output signals corresponding to those signal elements which constitute signal states representing binary values, disposed in parallel juxtaposition in an order corresponding to the respective positions of the transmission paths carrying those signal elements, and for producing a second output signal representative of the relative position of each transmission path carrying a signal element constituting such different signal state, wherein said signal separating means comprise a plurality of groups of signal actuated indicator elements with all of the elements of each group having a common connection at one side of said group and each group being arranged to conduct current in one direction relative to its common connection, and a plurality of conductors each associated with a respective input terminal, each conductor being connected for conducting a signal corresponding to that appearing at a respective input terminal to a respective indicator element group for controlling the signal level at the common connection of that group, and to each other indicator group for controlling the signal level at the other side of one respective indicator element thereof.

6. A receiving device as defined in claim 5 wherein each indicator element is a unidirectionally conductive device and each of said conductors is connected to the common connection of a respective group and to the other side of one respective device of each other group.

7. A receiving device as defined in claim 6 wherein each device is a LED, each group comprises seven LED's forming a seven-segment digit display, and each group is enabled in response to the appearance of such different signal state at that input terminal which is associated with that said conductor which is connected to the common connection of said group.

8. A digital information receiving device arranged to receive a signal composed of a plurality of elements arriving in parallel via a plurality of transmission paths each having a respective position, each path carrying a respective signal element and each signal element constituting either one of two signal states each representing a respective binary value or a signal state different from either binary value signal state, said device comprising: a plurality of input terminals each connected to a respective transmission path; and signal separating means connected to said input terminals for producing a first set of output signals corresponding to those signal elements which constitute signal states representing binary values, disposed in parallel juxtaposition in an order corresponding to the respective positions of the transmission paths carrying those signal elements, and for producing a second output signal representative of the relative position of each transmission path carrying a signal element constituting such different signal state, and further comprising a plurality of groups of individually addressable receivers connected to said signal separating means for selecting a group of receivers in dependence on the information contained in the second output signal and for addressing a respective receiver in the selected group in dependence on the value represented by the first set of output signals.

9. A receiving device as defined in claim 8 wherein each receiver is a memory location and each group is a memory bank.

* * * * *